(12) United States Patent
Bonner

(10) Patent No.: US 7,451,234 B1
(45) Date of Patent: Nov. 11, 2008

(54) SYSTEMS AND METHODS FOR UPDATING DYNAMIC IP ADDRESSES IN A FIREWALL USING A DDNS SERVER

(75) Inventor: Thomas W. Bonner, Smyrna, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 800 days.

(21) Appl. No.: 10/852,376

(22) Filed: May 24, 2004

Related U.S. Application Data

(60) Provisional application No. 60/473,315, filed on May 24, 2003.

(51) Int. Cl.
G06F 15/16 (2006.01)
G06F 15/173 (2006.01)

(52) U.S. Cl. .................. 709/245; 709/220; 709/221; 709/223

(58) Field of Classification Search .................. 455/410, 455/411, 456.5, 524, 525, 561; 709/220, 709/221, 223, 225, 228, 245
See application file for complete search history.

(56) References Cited

U.S. PATENT DOCUMENTS

| | | | | |
|---|---|---|---|---|
| 5,542,094 A | * | 7/1996 | Owada et al. | 455/433 |
| 6,052,788 A | * | 4/2000 | Wesinger et al. | 726/11 |
| 6,769,031 B1 | * | 7/2004 | Bero | 709/245 |
| 2003/0200184 A1 | * | 10/2003 | Dominguez et al. | 705/78 |
| 2003/0216140 A1 | * | 11/2003 | Chambert | 455/426.1 |
| 2005/0041638 A1 | * | 2/2005 | Peng | 370/352 |

OTHER PUBLICATIONS

Wellington, B. "Secure Domain Name System (DNS) Dynamic Update", The Internet Society, Nov. 2000.

* cited by examiner

*Primary Examiner*—Jeffrey Pwu
*Assistant Examiner*—Scott M Sciacca
(74) *Attorney, Agent, or Firm*—Robert Z. Evora; Paul E. Knowlton, Esq.; Parks Knowlton LLC

(57) ABSTRACT

A DDNS server maintains a dynamic database of host names and IP addresses of remote devices connected to a telecommunications network. Devices on the telecommunications network query the DDNS server for the IP addresses of the remote devices. As the IP addresses change, a DDNS client captures the new IP address and transmits the changes to the DDNS server where the IP address of the remote device is updated.

1 Claim, 3 Drawing Sheets

SYSTEMS AND METHODS FOR UPDATING DYNAMIC IP ADDRESSES IN A FIREWALL USING A DDNS SERVER

This patent claims benefit of U.S. Provisional Application No. 60/473,315, filed May 24, 2003, entitled "Systems and Methods for Updating Dynamic IP Addresses in a Firewall Using DDNS Service." This provisional patent application is incorporated herein by reference in its entirety.

BACKGROUND OF THE INVENTION

1. Field of Invention

This invention relates to systems and method for automating the process of allowing external devices having dynamic IP addresses access to a home base station controller (HBSC) that is protected by a firewall. More specifically, this invention relates to automatically updating dynamic IP addresses in the firewall.

2. Description of Related Art

In GSM networks, home base stations (HBS) communicate with home base station controllers (HBSC) using a public IP network. This broadband connection is used to route voice and data traffic between the device and the HBSC. The HBSC is the device within the GSM architecture that is responsible for Radio Resource allocation to a mobile station, frequency administration and handover between an HBS controlled by the HBSC. This configuration causes numerous security risks for the controller in that outside sources can masquerade as a legitimate HBS and generate traffic from the HBSC.

In the HBSC, three different IP interfaces are exposed to the public IP network. Each is protected in different ways. Traditional IP security mechanisms, used to protect private networks from unauthorized use or intrusion, employ an IP filtering method in a firewall that restricts unknown IP addresses from passing through the firewall.

Traditional methods require the HBS to use a static IP address. However, many broadband services for consumers include dynamic IP addresses that are subject to change without notice. Therefore, a dynamic IP address will not work with traditional IP security mechanisms used to protect the HBSC. This approach significantly limits the operation of the HBSC because either the IP addresses have to be manually entered into the IP firewall filter list each time a valid IP address changes or the HBSC is forced to "learn" the new IP address. Until the "learning" is complete, the traffic flow between the HBS and the HBSC may be interrupted.

SUMMARY OF THE INVENTION

The embodiments described herein allow a firewall with traditional IP filtering capabilities to protect a private network while supporting HBSs with dynamic IP addresses. Also claimed is a method to automate the firewall configuration process to update the IP filter list as the HBS dynamic IP addresses change.

Accordingly, this invention first provides systems and methods for using a dynamic domain name service (DDNS) to collect and store the dynamic IP addresses of the HBS.

Secondly, this invention provides systems and methods to automate the process of updating the IP filter list in the firewall using the IP addresses stored in the DDNS.

These and other features and advantages of this invention are described in or apparent from the following detailed description of the apparatus/systems and method according to this invention.

BRIEF DESCRIPTION OF THE DRAWINGS

Various exemplary embodiments of this invention will be described in detail, wherein like reference numerals refer to identical or similar components or steps, with reference to the following figures, wherein.

DETAILED DESCRIPTION OF EXEMPLARY EMBODIMENTS

While the following detailed description will be described relating to communications between an HBS and an HBSC, it should be appreciated that the embodiments of this invention can be applied to any system using dynamic IP addresses and a firewall.

Figure 1:
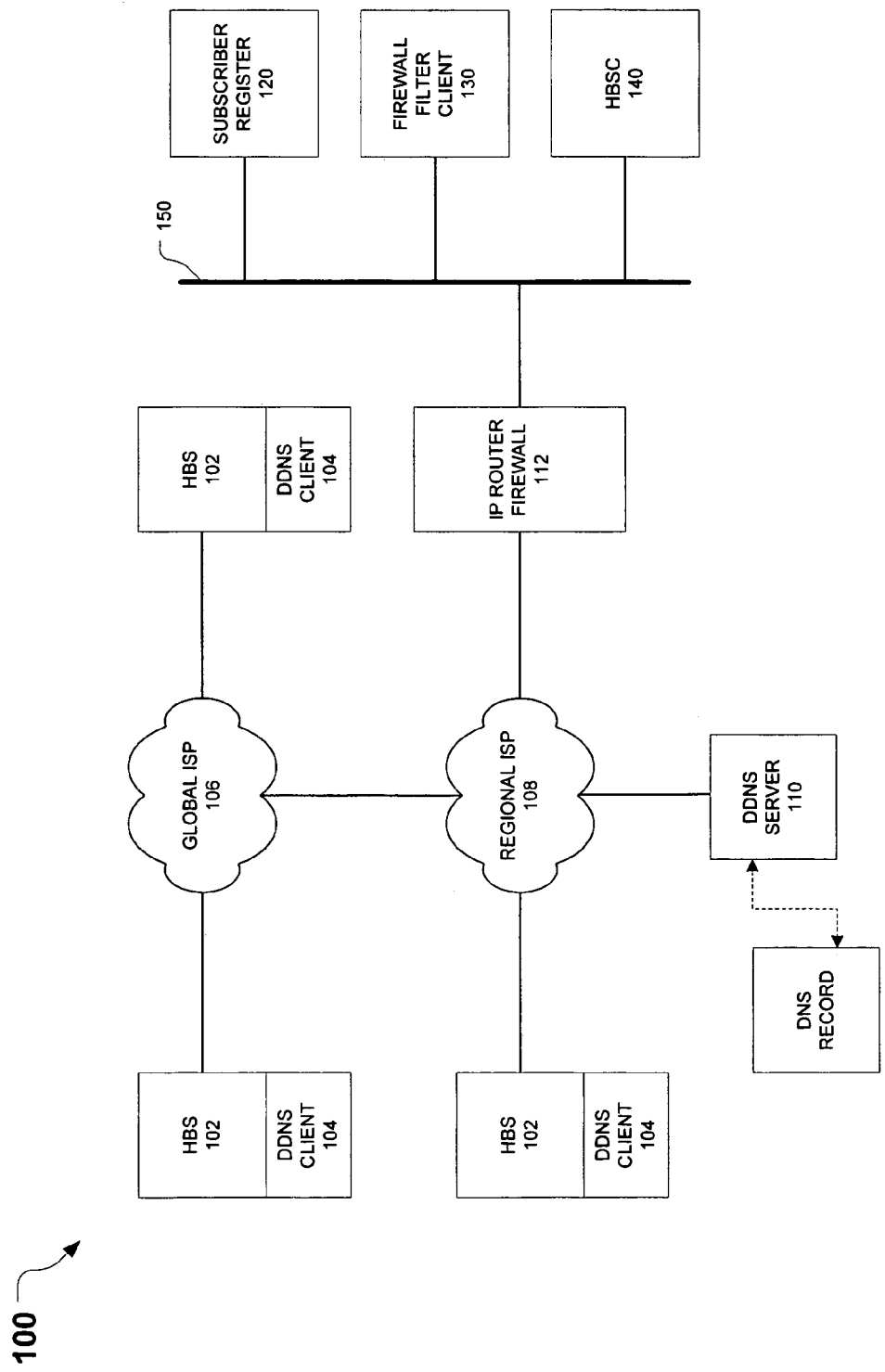
FIG. 1 illustrates an exemplary embodiment of a system for dynamic updating of IP addresses in a firewall using a dynamic domain name server, according to this invention.

As shown in FIG. 1, the systems and methods according to this invention allow a firewall with conventional IP filtering capabilities to protect the private network while supporting HBSs with dynamic IP addresses. Additionally, a method is provided that automates the firewall configuration process to update the IP filter list in the IP Router Firewall 112 as the HBS 102 dynamic IP addresses change.

FIG. 1 illustrates the preferred embodiment of the systems for dynamic updating of IP addresses in a firewall, according to this invention. As shown in FIG. 1, the system 100 contains a series of Home Base Stations (HBS) 102, wherein each HBS 102 has an associated DDNS client 104. Each HBS 102 is also communicatively attached to a Global ISP 106, a Regional ISP 108, a DDNS Server 110 and an IP router firewall 112. Connected to the IP router firewall 112 is a high-speed internet bus 150 connectable to a subscriber register 120, a firewall filter client 130 and a home base station controller (HBSC) 140. All communications between the IP router firewall 112 and the subscriber register 120, firewall filter client 130 or HBSC 140 take place over the high-speed internet bus 150.

As known in the art, there are numerous instances where the IP address of the HBS 102 may change. For example, the IP address can change at power up of the HBS 102 after re-registering the HBS 102 with the network, due to an interruption of communications to between the HBS 102 and the HBSC 140 or expiration of a lease of the previous IP address.

In operation, the DDNS server 110 maintains a dynamic database for resolving host names and IP addresses of each HBS 102. Network devices, such as the subscriber register 120, firewall filter client 130 and the HBSC 140, query the DDNS server 110 by specifying a remote device's (HBS 102) host name and receives in return the host's (HBS 102) IP addresses. This action and update of the IP addresses allow the HBSC 140 to communicate with the HBS 102.

As the IP addresses of HBS 102 change, for example on power up of the HBS 102, the DDNS client 104 captures the new IP address and forwards it to the DDNS server 110. Upon receipt of the new IP address, the DDNS server 110 updates its DNS record.

The DDNS server 110 then transmits a User Datagram Protocol (UDP) notification to the subscriber register 120. The UDP notification is a standard, connectionless, host-to-host protocol message that is used over packet-switched computer communications network. After receiving the UDP notification from the DDNS server 110, the subscriber register 120 queries the DDNS server 110 for the new updates.

The DDNS server 110 then forwards the appropriate updates to the subscriber register 120. Upon receipt of the updates, the subscriber register 120 then sends a UDP notification to the firewall filter client 130. The firewall filter client 130 then queries the subscriber register 120 for the updates.

Finally, the firewall filter client 130 then compares its updates to an IP filter list in the IP router firewall 112 and makes the necessary changes. Accordingly, the HBS 102 can now communicate with the HBSC 140 because the appropriate IP address changes in the filter list have been updated.

It should be appreciated that although the embodiments herein have been described as having a specific sequence of events, the sequence can be modified without taking away from the scope of the invention. For example, in a second embodiment, as the IP addresses of HBS 102 change, the DDNS client 104 can capture the new IP address and forwards it to the DDNS server 110. Upon receipt of the new IP address, the DDNS server 110 updates its DNS record.

The DDNS server 110 then transmits a UDP notification to the IP router firewall 112. After receiving the UDP notification from the DDNS server 110, the IP router firewall 112 queries the DDNS server 110 for the new updates.

The DDNS server 110 then forwards the appropriate updates to the IP router firewall 112. Upon receipt of the updates, the IP router firewall 112 then sends a UDP notification to the subscriber register 120. The subscriber register 120 then queries the IP router firewall 112 for the updates.

Finally, the firewall filter client 130 then compares its updates to an IP filter list in the subscriber register 120 and makes the necessary changes.

Figure 2:
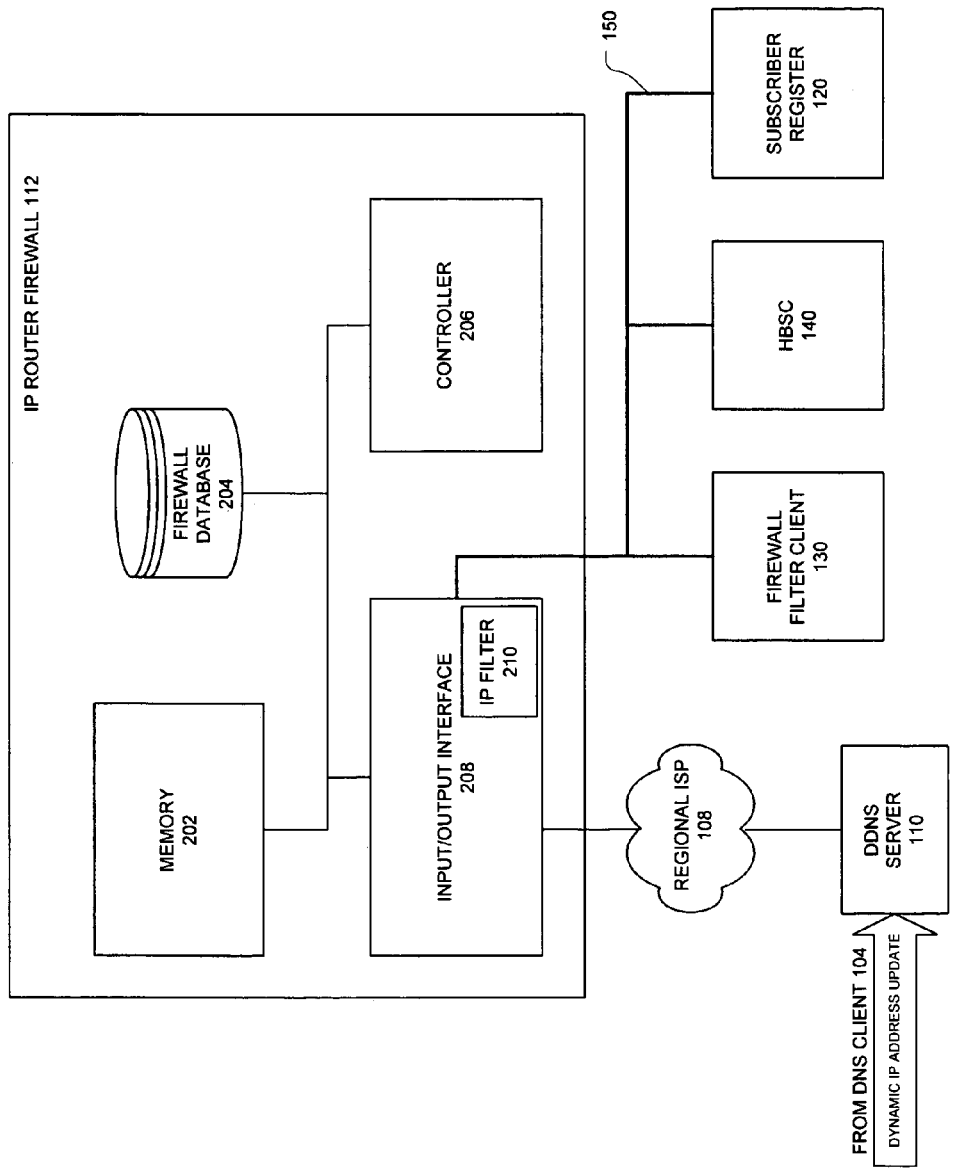
FIG. 2 represents an exemplary embodiment of a IP router firewall according to this invention.
Figure 3:
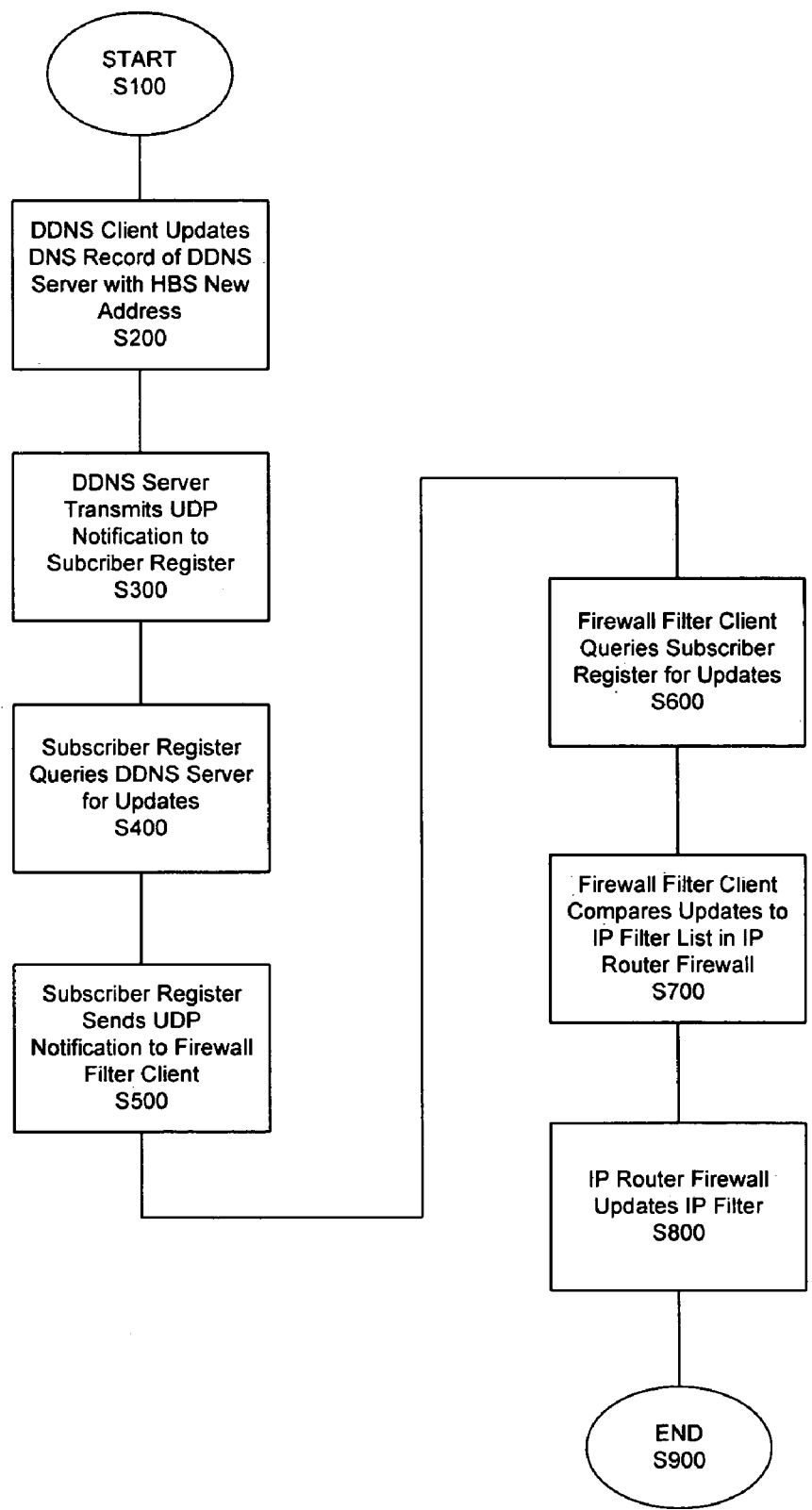
FIG. 3 illustrates an exemplary method for updating dynamic IP addresses in a firewall, according to this invention.

FIG. 2 illustrates an exemplary embodiment of the IP router firewall 112. As shown, the IP router firewall 112 contains a memory 202, a firewall database 204, a controller 206, and an input/output interface 208. The input/output interface 208 also contains an IP filter 210. It should be understood that each of the items shown in FIG. 2 could be implemented as portions of a suitably programmed general-purpose computer. Alternatively, each of the items in FIG. 2 could be implemented as physically distinct hardware circuits within an ASIC, or using a FPGA, a PDL, a PLA or a PAL, a digital signal processor, or using discrete logic elements or discrete circuit elements. The particular form of each of the circuits or routines shown in FIG. 3 is a matter of design choice and will be readily determined by one skilled in the art.

The input/output interface 208 is a bidirectional communication/data transport link between the regional ISP 108, firewall filter client 130, HBSC 140 subscriber register 120 and the IP router firewall 112. The input/output interface 208 also routes data to one or more of the controller 206, memory 202, firewall database 204 and the IP filter 210.

The memory 202 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a writable or re-writable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The controller 206 can be implemented as a single special purpose integrated circuit (e.g., ASIC) having a main or central processor section for overall, system-level control, and separate sections dedicated to performing various different specific computations, functions and other processes under the control of the central processor section. The controller 206 can also be implemented as a single microprocessor circuit or a plurality of separate dedicated or programmable integrated or other electronic circuits or devices, e.g., hard-wired electronic or logic circuits such as discrete element circuits or programmable logic devices. The controller 206 also preferably includes other circuitry or components, such as memory devices, relays, mechanical linkages, communications devices, etc., to affect desired control and/or input/output functions.

In normal operation, i.e., without a change in the IP address of a connected HBS 102, under control of the controller 206, communications between the HBS 102 and the HBSC 140 are input into and output from the input/output interface 208. As communications are received at the input/output interface 208, the controller 206 is continuously comparing the IP address of the HBS 102 with a series of valid IP addresses in the firewall database 204. If the IP address of the corresponding HBS 102 does not match the entries in the firewall database 204, the communications from that HBS 102 are blocked. Otherwise, communications freely flow to and from the HBSC 140.

The memory 202 contains a list of valid IP addresses and the host name of the corresponding HBS 102 the addresses correspond. The term "valid" IP address refers to any IP address that represents an HBS 102 that has been previously validated for communication with the HBSC 140. When a notification of an IP address update is sent from a valid HBS 102, as mentioned above, an IP address update is sent from the DNS client 104 to the DDNS server 110. Once the subscriber register 120 and the firewall filter client 130 are updated according to the process mentioned above with respect to FIG. 1, the firewall filter client 130 updates the firewall database 204.

Upon update of the firewall database 204, under control of the controller 206, the IP filter 120 is also updated. Accordingly, the HBS 102 corresponding to the newly updated IP address or addresses can now communicate with the HBSC 140 using the new IP address.

FIG. 3 illustrates a method for dynamically updating IP addresses in a firewall, according to this invention. The method begins at step S100 and continues to step S200 where the DDNS client 104 captures an IP address change at an HBS 102. The DDNS Client 104 then updates the DNS record of the DDNS Server 110 with the new IP address. The method then continues to step S300.

At step S300, the DDNS server 110 transmits a UDP notification to the subscriber register 120. The method then continues to step S400.

At step S400, the subscriber register 120 queries the DDNS server 110 for updates on the new IP addresses. The process then continues to step S500.

At step S500, the subscriber register 120 sends a UDP notification to the firewall filter client 130. The process then continues to step S600 where the firewall filter client 130 queries the subscriber register 120 for updates. The process then continues to step S700.

At step S700, the firewall filter client 130 compare the updates to the IP filter list contained in the firewall database 204. The process then continues to step S800.

In step S800, the IP router firewall 112 performs an update of the IP filter list. The process then ends at step S900.

While this invention has been described in conjunction with the exemplary embodiments outlined above, it is evident that many alternatives, modifications and variations will be apparent to those skilled in the art. Accordingly, the exemplary embodiments of the invention, as set forth above are intended to be illustrative, not limiting. Various changes may be made without departing from the spirit and the scope of the invention.

What is claimed:

1. A method for dynamic updating of an IP router firewall using a DDNS server, comprising:

capturing, by a DDNS client attached to an HBS, a change in at least one HBS IP address;

notifying, upon a change in the at least one HBS IP address, a DDNS server of the at least one HBS IP address change;

transmitting, from the DDNS server to a subscriber register, a UDP notification indicating at least one HBS IP address change;

querying, by a firewall filter client, the subscriber register for the at least one changed HBS IP address;

comparing, at the firewall filter client, the at least one changed HBS IP address to an IP address filter list in the IP router firewall;

determining, at the firewall filter client, what items in the IP address filter list to alter; and altering, at the IP router firewall, the IP address filter list with the at least one changed HBS IP address.

* * * * *